(12) United States Patent
Lee et al.

(10) Patent No.: US 9,100,878 B2
(45) Date of Patent: Aug. 4, 2015

(54) APPARATUS AND METHOD FOR CONNECTING WITH NETWORK IN PORTABLE TERMINAL

(71) Applicant: Samsung Electronics Co., Ltd., Gyeonggi-do (KR)

(72) Inventors: Shin-Duck Lee, Daegu (KR); Jong-Phil Lee, Daegu (KR); Hyun-Chul Lee, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 102 days.

(21) Appl. No.: 13/847,144

(22) Filed: Mar. 19, 2013

(65) Prior Publication Data

US 2013/0252615 A1    Sep. 26, 2013

(30) Foreign Application Priority Data

Mar. 20, 2012    (KR) .................. 10-2012-0028082

(51) Int. Cl.
*H04W 36/00* (2009.01)
*H04W 48/12* (2009.01)
*H04W 48/18* (2009.01)
*H04W 88/06* (2009.01)

(52) U.S. Cl.
CPC ...... *H04W 36/0022* (2013.01); *H04W 36/0061* (2013.01); *H04W 48/12* (2013.01); *H04W 48/18* (2013.01); *H04W 88/06* (2013.01)

(58) Field of Classification Search
USPC .............. 455/411, 432, 410, 67.11, 419, 423, 455/437, 438, 439, 442, 443, 435.1, 435.2, 455/428, 436
See application file for complete search history.

(56) References Cited

U.S. PATENT DOCUMENTS

2011/0151877 A1*  6/2011  Tafreshi ................... 455/442
2011/0307932 A1* 12/2011  Fan et al. .................. 725/110
2012/0202481 A1*  8/2012  Martin ..................... 455/423

FOREIGN PATENT DOCUMENTS

EP         2249607 A1    11/2010
WO    2011/058214 A1     5/2011
WO    2012/174428 A1    12/2012

OTHER PUBLICATIONS

Nokia Corporation, et al.; "Handling Neighbour Cell Lists for E-UTRAN;" 3GPP Draft; GP-080167; Feb. 12, 2008; XP050019517.

* cited by examiner

*Primary Examiner* — David Q Nguyen
(74) *Attorney, Agent, or Firm* — Cha & Reiter, LLC

(57) ABSTRACT

An apparatus and method for connecting with a network in a portable terminal includes performing measurement on a neighbor cell supporting a first network based on pre-stored neighbor cell information for the first network if neighbor cell information for the first network is not received over a second network when the portable terminal tries to access the first network while camping in the second network.

8 Claims, 4 Drawing Sheets

APPARATUS AND METHOD FOR CONNECTING WITH NETWORK IN PORTABLE TERMINAL

CLAIM OF PRIORITY

This application claims the benefit under 35 U.S.C. §119 (a) of a Korean Patent Application filed in the Korean Intellectual Property Office on Mar. 20, 2012 and assigned Serial No. 10-2012-0028082, the entire disclosure of which is incorporated herein by reference.

BACKGROUND OF THE INVENTION

1. Field of the Invention

The present invention relates generally to a portable terminal, and more particularly, to an apparatus and method for connecting to a network with a portable terminal.

2. Description of the Related Art

While connected to a second generation (2G) or third generation (3G) network, a portable terminal supporting a fourth generation (4G) or Long Term Evolution (LTE) network may perform a handover by receiving a neighbor cell measurement information message such as SI2quater and PSI3quater, from the 2G or 3G network to which it is presently connected, and also detect quality information of its neighbor cells from the neighbor cell measurement information message.

However, in the case where service providers do not update their existing 2G (e.g., Global System for Mobile communications (GSM)) networks or 3G (e.g., Universal Mobile Telecommunications System (UMTS)) networks due to problems such as system reliability and cost, a portable terminal that subscribes to a 4G (LTE) network and is physically located in an area covered by the network may not connect with or access the 4G (LTE) network because it cannot measure cells (to be specific, cannot measure strengths of signals from cells) of the 4G (LTE) network in the 2G network.

Therefore, a user of the portable terminal may not use or access the 4G (LTE) network despite being physically located within the coverage area of the 4G (LTE) network, and therefore, the user may presume erroneously that there is a problem with the portable terminal.

SUMMARY OF THE INVENTION

An aspect of an exemplary embodiment of the present invention is to provide an apparatus and method for connecting with a first network based on pre-stored cell information for the first network when cell information for the first network is not received over a second network.

In accordance with one aspect of the present invention, there is provided an apparatus for connecting to a network with a portable terminal. The apparatus includes: a memory unit for storing neighbor cell information for a first network, and a controller for performing measurements on a neighbor cell of the first network based on the stored neighbor cell information if neighbor cell information for the first network is not received over a second network when the portable terminal tries to access the first network while located within the coverage area of the second network, wherein the first network is accessed after performing the measurement.

In accordance with another aspect of the present invention, there is provided a method for connecting to a network with a portable terminal. The method includes performing measurements on a neighbor cell of a first network based on pre-stored neighbor cell information for the first network if neighbor cell information for the first network is not received over a second network when the portable terminal tries to access the first network while located within coverage area of the second network, wherein the first network is accessed after performing the measurement.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Exemplary embodiments of the present invention will now be described in detail with reference to the accompanying drawings. Like reference numbers are used to refer to like elements throughout the drawings.

A portable terminal according to an embodiment of the present invention is a mobile electronic device that its user may easily carry with him or her, such as a videophone, a mobile phone, a smart phone, an International Mobile Telecommunication 2000 (IMT-2000) terminal, a Universal Mobile Telecommunications System (UMTS) terminal, a Personal Digital Assistant (PDA), a Portable Multimedia Player (PMP), a Digital Multimedia Broadcasting (DMB) terminal, an E-Book, a portable computer (e.g., a laptop computer and a tablet PC), or a terminal or digital camera supporting multiple Radio Access Technologies (RATs).

Figure 1:
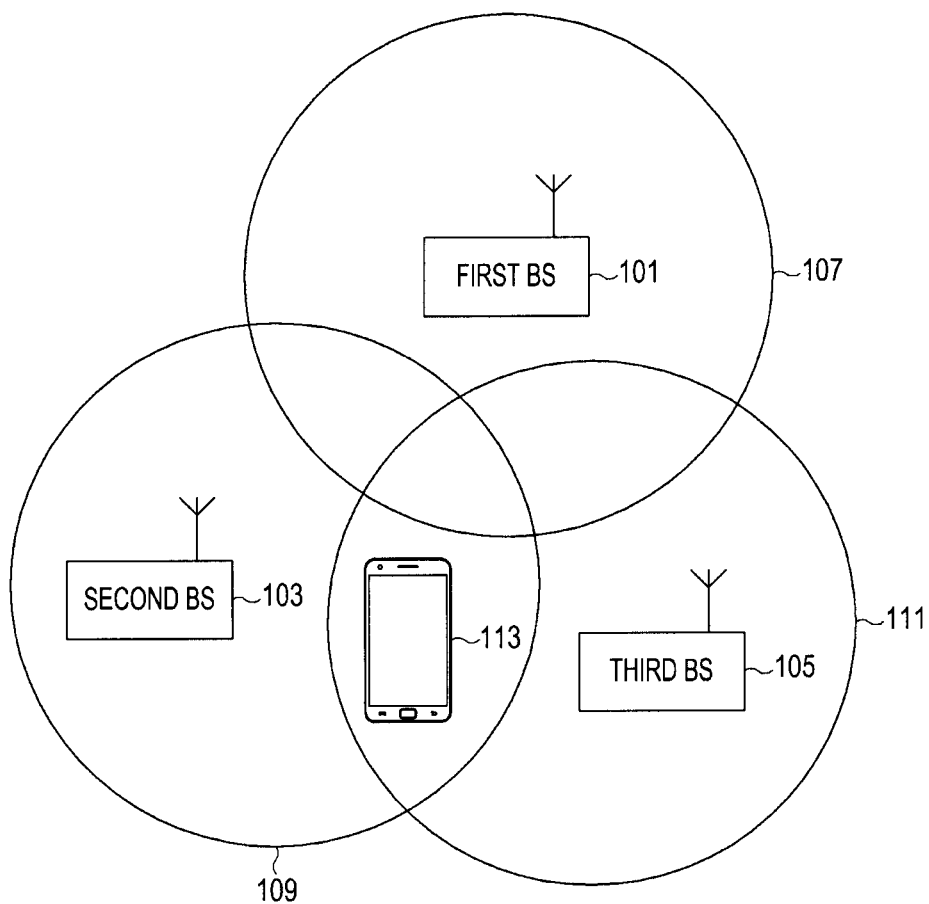
FIG. 1 illustrates a configuration of a communication system according to an embodiment of the present invention.

FIG. 1 shows a configuration of a communication system according to an embodiment of the present invention.

Referring to FIG. 1, the communication system includes a first Base Station (BS) 101, a second BS 103, a third BS 105, and a portable terminal 113.

The first BS 101 has a first cell 107 representing its coverage area (or communication service area), the second BS 103 has a second cell 109 representing its coverage area, and the third BS 105 has a third cell 111 representing its coverage area. The first to third BSs 101, 103 and 105 communicate with the portable terminal 113 over a wireless link (not shown).

The second BS 103 may support a RAT different from that of the first BS 101 and third BS 105. For example, the first BS 101 and the third BS 105 may support Long Term Evolution (LTE), which is one type of RAT, whereas the second BS 103 may support Global System for Mobile communications (GSM) representing another type of RAT. Another example is where the first BS 101 and the third BS 105 may support Universal Mobile Telecommunication System (UMTS), which is one type of RAT, while the second BS 103 may support GSM. GSM belongs to a 2G wireless communication system (hereinafter, referred to as '2G network'), UMTS belongs to a 3G wireless communication system (hereinafter, referred to as '3G network'), and LTE belongs to a 4G wireless communication system (hereinafter, referred to as '4G network').

The portable terminal 113 supports multiple RATs and performs a communication service using one of the multiple RATs. For example, when the first BS 101 and the third BS 105 support an LTE network and the portable terminal 113 is placed in the first cell 107 or the third cell 111, the portable terminal 113 may provide a communication service to its user using the 4G (LTE) network. As another example, when the second BS 103 supports GSM and the portable terminal 113 is placed in the second cell 109, the portable terminal 113 may provide a communication service to the user using the 2G (GSM) network.

In particular, if the second BS 103 cannot provide LTE neighbor cell information, the portable terminal 113 measures the LTE network based on pre-stored LTE neighbor cell information while camping (i.e., physically located within coverage area of a cell of a network) in the 2G network. The term 'LTE neighbor cell information' as used herein may refer to information obtained about a cell supporting the 4G (LTE) network from among at least one adjacent cell that does not support the LTE network (i.e., BS 103 for the example being discussed).

In particular, after camping in the 4G (LTE) network supported by the first BS 101, the portable terminal 113 determines whether a first neighbor cell measurement information message is received from the first BS 101. The first neighbor cell measurement information message includes information about at least one cell adjacent to the first BS 101 and may include LTE neighbor cell information to be used to perform measurement on a neighbor cell supporting the 4G (LTE) network.

If it is determined that a first neighbor cell measurement information message is received, the portable terminal 113 detects the LTE neighbor cell information from this first neighbor cell measurement information message and stores the detected LTE neighbor cell information.

When the portable terminal 113 tries an RAT reselection from the 2G network to the 4G (LTE) network while camping in the 2G network supported by the second BS 103, the portable terminal 113 determines whether a second neighbor cell measurement information (SI2quater) message has been received from the second BS 103. The second neighbor cell measurement information message includes information about at least one cell adjacent to the second BS 103 and may or may not include LTE neighbor cell information to be used to perform measurement on a neighbor cell supporting the 4G (LTE) network.

If it is determined that the second neighbor cell measurement information message is received, the portable terminal 113 determines whether the LTE neighbor cell information exists in the second neighbor cell measurement information message. If it is determined that the LTE neighbor cell information exists in the second neighbor cell measurement information message, the portable terminal 113 performs measurement on an LTE cell based on the detected LTE neighbor cell information from the second neighbor cell measurement information message. Otherwise, if the LTE neighbor cell information does not exist in the second neighbor cell measurement information message, the portable terminal 113 performs measurement on an LTE cell based on the pre-stored LTE neighbor cell information.

Figure 2:
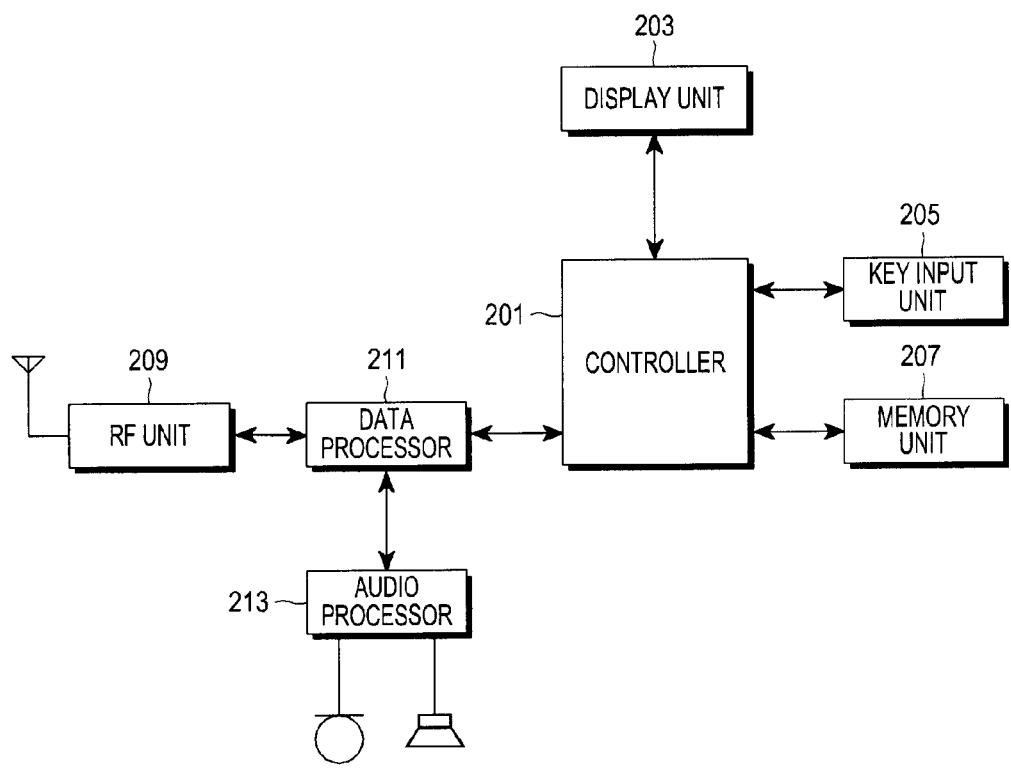
FIG. 2 is a block diagram of a portable terminal according to an embodiment of the present invention.

FIG. 2 is a block diagram of the portable terminal 113 according to an embodiment of the present invention.

Referring to FIG. 2, the portable terminal 113 includes a controller 201, a display unit 203, a key input unit 205, a memory unit 207, a Radio Frequency (RF) unit 209, a data processor 211, and an audio processor 213.

The RF unit 209 performs a wireless communication function of the portable terminal 113. The RF unit 209 includes an RF transmitter for up-converting a frequency of transmission signals and amplifying the up-converted transmission signals, and an RF receiver for low-noise-amplifying received signals and down-converting a frequency of the amplified received signals. The data processor 211 includes a transmitter for coding and modulating the transmission signals, and a receiver for demodulating and decoding the received signals. In other words, the data processor 211 may include a modulator/demodulator (modem) and a coder/decoder (codec). The codec includes a data codec for processing data signals such as packet data, and an audio codec for processing audio signals such as voice.

The audio processor 213 plays received audio signals output from the audio codec in the data processor 211, and transfers transmission audio signals picked up by a microphone to the audio codec in the data processor 211. The key input unit 205 includes alphanumeric keys for inputting alphanumeric information, and function keys for setting various functions. The display unit 203 displays images on a screen and displays output data requested by the controller 201.

When the display unit 203 is realized to have a capacitive or resistive touch screen, the key input unit 205 may include the minimum number of preset keys. In this case, the display unit 203 may replace some of the key input functions of the key input unit 205.

The memory unit 207 may include a program memory and a data memory. The program memory may store booting programs and an Operating System (OS) program for controlling a general operation of the portable terminal 113, and the data memory may store the data generated during an operation of the portable terminal 113. In particular, the memory unit 207 stores neighbor cell information for a first network that is used to perform measurement on a cell supporting the first network. The first network may be part of a 4G (LTE) network, and neighbor cell information for the LTE network may be LTE neighbor cell information.

The controller 201 controls the overall operation of the portable terminal 113. In particular, the controller 201 may connect with the first network based on pre-stored neighbor cell information for the first network when the portable terminal 113 is not connected to the first network.

More specifically, the controller 201 determines whether a first neighbor cell measurement information message is received from the first BS 101, while the portable terminal 113 is camping in the first network supported by the first BS 101.

The first neighbor cell measurement information message includes information about at least one cell adjacent to the first BS 101. For example, when a cell supporting the first network, a cell supporting a second network, and a cell supporting a third network are located around the first BS 101, the first neighbor cell measurement information message may include neighbor cell information for the first network, neighbor cell information for the second network, and neighbor cell information for the third network. The first network may be a 4G (LTE) network, the second network may be a 2G (GSM) network, and the third network may be a 3G (UTMS) network.

Upon receiving the first neighbor cell measurement information message, the controller 201 detects the neighbor cell information for the first network from the first neighbor cell measurement information message and stores the detected neighbor cell information for the first network in the memory unit 207. If the neighbor cell information for the first network is already stored in the memory unit 207, the controller 201 may update the stored neighbor cell information based on the detected neighbor cell information.

Thereafter, when the portable terminal 113 tries an RAT reselection from the second network to the first network while the portable terminal 113 is camping in the second network supported by the second BS 103, the controller 201 determines whether a second neighbor cell measurement information message has been received from the second BS 103.

The second neighbor cell measurement information message includes information about at least one cell adjacent to the second BS 103. For example, when a cell supporting the first network, a cell supporting the second network, and a cell supporting the third network are located around the second BS 103, the second neighbor cell measurement information message includes the neighbor cell information for the second network and the neighbor cell information for the third network, and may or may not include the neighbor cell information for the first network according to whether the second network is updated. If the second network is a 2G (GSM) network, the second neighbor cell measurement information message may be an SI2quater message.

If it is determined that the second neighbor cell measurement information message has been received, the controller 201 determines whether the neighbor cell information for the first network exists in the second neighbor cell measurement information message. If it is determined that the neighbor cell information for the first network exists in the second neighbor cell measurement information message, the controller 201 performs measurement on at least one cell supporting the first network based on the detected neighbor cell information for the first network. Otherwise, if the neighbor cell information for the first network does not exist in the second neighbor cell measurement information message, the controller 201 performs measurement on at least one cell supporting the first network based on the neighbor cell information for the first network stored in the memory unit 207.

Figure 3:
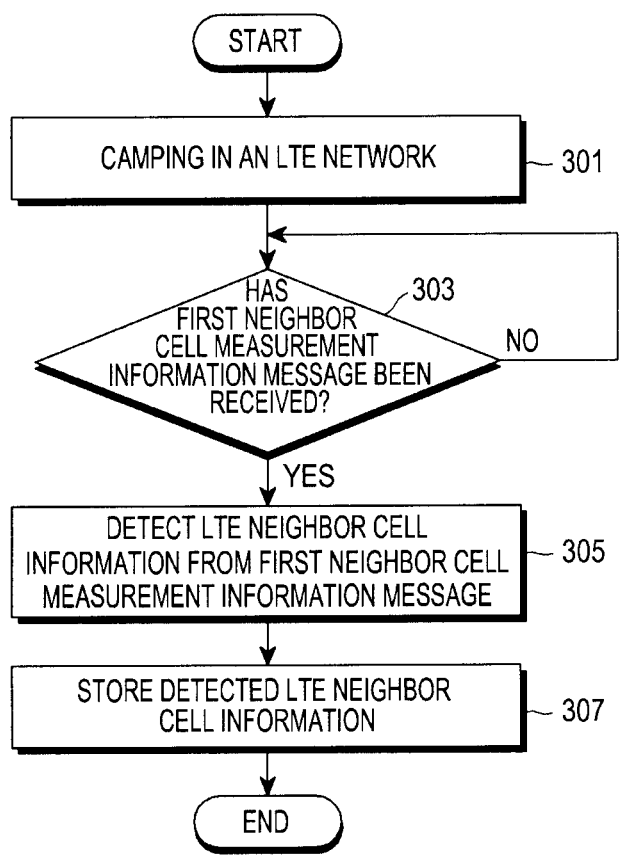
FIG. 3 illustrates a process of storing LTE neighbor cell information in a portable terminal according to an embodiment of the present invention.

FIG. 3 illustrates a process of storing LTE neighbor cell information in a portable terminal according to an embodiment of the present invention. An operation of the portable terminal camping in a 4G (LTE) network will be described with reference to FIG. 3.

Referring to FIG. 3, in step 301, the portable terminal is camping in an LTE network supported by the first BS 101. In step 303, the portable terminal determines whether a first neighbor cell measurement information message has been received from the first BS 101.

The first neighbor cell measurement information message includes information about at least one cell adjacent to the first BS 101. For example, when a cell supporting a first network, a cell supporting a second network, and a cell supporting a third network are located around the first BS 101, the first neighbor cell measurement information message may include neighbor cell information for the first network, neighbor cell information for the second network, and neighbor cell information for the third network. The first network refers to a 4G (LTE) network, the second network refers to a 2G (GSM) network, and the third network refers to a 3G (UTMS) network.

Upon receiving the first neighbor cell measurement information message, the portable terminal proceeds to step 305. Otherwise, the portable terminal repeatedly performs step 303 until it detects LTE neighbor cell information at which point it proceeds to step 305. In step 305, the portable terminal detects LTE neighbor cell information from the first neighbor cell measurement information message. The LTE neighbor cell information refers to the neighbor cell information for the LTE network. In step 307, the portable terminal stores the detected LTE neighbor cell information. If the neighbor cell information for the first network is already stored, the portable terminal may update the stored neighbor cell information based on the detected neighbor cell information.

Figure 4:
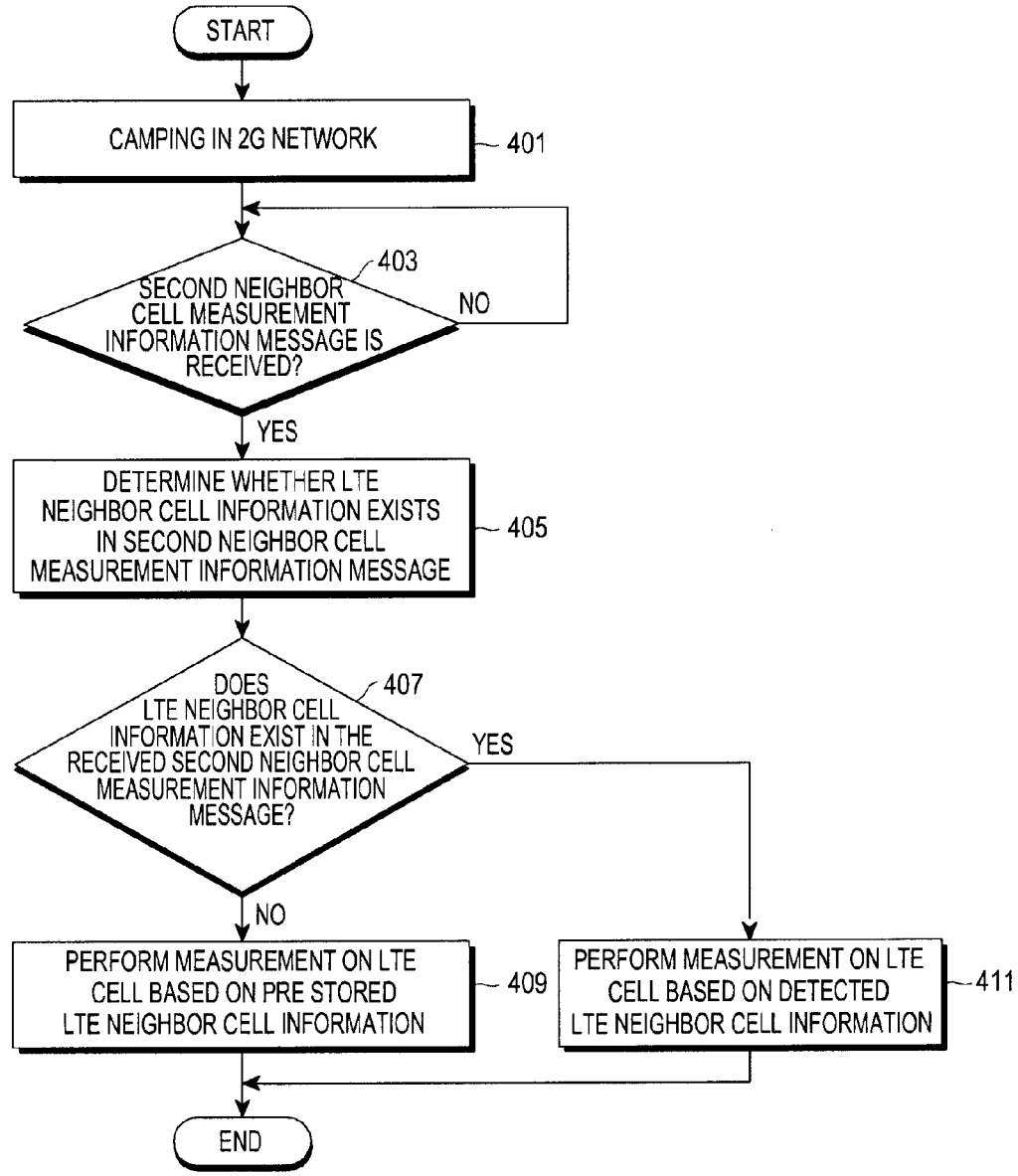
FIG. 4 illustrates a process of measuring an LTE cell in a portable terminal according to an embodiment of the present invention.

FIG. 4 illustrates a process of measuring an LTE cell in a portable terminal according to another embodiment of the present invention. An operation of the portable terminal trying to access an LTE network based on pre-stored LTE neighbor cell information when neighbor cell information for the LTE network from among its connectable 2G, 3G, and LTE networks is not received will be described with reference to FIG. 4.

Referring to FIG. 4, in step 401, the portable terminal is camping in the 2G network supported by the second BS 103. In step 403, the portable terminal determines whether a second neighbor cell measurement information message is received from the second BS 103 when the portable terminal tries an RAT reselection from a second network to a first network.

The second neighbor cell measurement information message includes information about at least one cell adjacent to the second BS 103. For example, when a cell supporting the first network, a cell supporting the second network, and a cell supporting a third network are located around the second BS 103, the second neighbor cell measurement information message includes neighbor cell information for the second network and neighbor cell information for the third network, and may or may not include neighbor cell information for the first network according to whether the second network is updated.

The first network refers to a 4G (LTE) network, the second network refers to a 2G (GSM) network, and the third network refers to a 3G (UTMS) network. If the second network is a 2G (GSM) network, the second neighbor cell measurement information message may be an SI2quater message.

Upon receiving the second neighbor cell measurement information message, the portable terminal proceeds to step 405. Otherwise, the portable terminal repeatedly performs step 403 until it has determined that the second neighbor cell measurement information has been received at which point it moves to step 405.

In step 405, the portable terminal determines whether LTE neighbor cell information exists in the second neighbor cell measurement information message. If it is determined in step 407 that the LTE neighbor cell information exists, the portable terminal proceeds to step 411. Otherwise, the portable terminal proceeds to step 409.

In step 411, the portable terminal performs measurement on at least one neighbor cell supporting the 4G (LTE) network based on the detected LTE neighbor cell information. In step 409, the portable terminal performs measurement on at least one neighbor cell supporting the 4G (LTE) network based on the pre-stored LTE neighbor cell information.

As is apparent from the foregoing description, a portable terminal proposed by the present invention may connect with a first network based on pre-stored cell information for the first network when cell information for the first network is not received over a second network.

In addition, while camping in a 2G (GSM) network, the proposed portable terminal may automatically try to access a 4G (LTE) network without violating its network specification, even when LTE neighbor cell information does not exist in an SI2quater message, thus allowing the user to conveniently access the network.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments such as a mobile communication terminal, it will be understood by those skilled in the art that various changes in form and details may be made therein without departing from the spirit and scope of the invention as defined by the appended claims and their equivalents.

What is claimed is:

1. An apparatus for connecting to a network in a portable terminal, comprising:
    a memory configured to store first network neighbor cell information received from a first cell if the portable terminal is camped thereon, wherein the first cell is a cell supporting a first network and transmits a first neighbor cell measurement information message including the first network neighbor cell information; and
    a processor configured to:
        receive a second neighbor cell measurement information message from a second cell if the portable terminal is camped thereon, wherein the second cell is a cell supporting a second network different from the first network,
        detect whether the received second neighbor cell measurement information message includes the first network neighbor cell information, and
        if the second neighbor cell information message does not include the first network neighbor cell information, perform a measurement on at least one first network based on the stored first network neighbor cell information to attempt accessing the first network.

2. The apparatus of claim 1, wherein if the second neighbor cell measurement information message includes the first network neighbor cell information, the processor performs a measurement on at least one first cell based on the first neighbor information included in the second neighbor cell measurement information message.

3. The apparatus of claim 1, wherein the portable terminal is connectable to any one of second generation (2G), third generation (3G) and fourth generation (4G) networks, and the first network is the 4G network.

4. The apparatus of claim 3, wherein the second cell is a cell supporting the 2G network.

5. A method for connecting with a network in a portable terminal, comprising:
    storing in memory first network neighbor cell information received from a first cell if the portable terminal is camped thereon, wherein the first cell is a cell supporting a first network and transmits a first neighbor cell measurement information message including the first network neighbor cell information;
    receiving a second neighbor cell measurement information message from a second cell if the portable terminal is camped thereon, wherein the second cell is a cell supporting a second network different from the first network;
    detecting whether the received second neighbor cell measurement information message includes the first network neighbor cell information; and
    if the second neighbor cell information message does not include the first network neighbor cell information, performing a measurement on at least one first network based on the stored first network neighbor cell information to attempt accessing the first network.

6. The method of claim 5, further comprising
    if the second neighbor cell measurement information message includes the first network neighbor cell information, performing a measurement on at least one first cell based on the first neighbor information included in the second neighbor cell measurement information message.

7. The method of claim 5, wherein the portable terminal is connectable to any one of second generation (2G), third generation (3G) and fourth generation (4G) networks, and the first network is the 4G network.

8. The method of claim 7, wherein the second cell is a cell supporting the 2G network.

* * * * *